United States Patent [19]

Ginsberg et al.

[11] 4,277,284
[45] Jul. 7, 1981

[54] SINGLE-PACKAGE ZINC-RICH COATINGS

[75] Inventors: Thomas Ginsberg, Piscataway; Lawrence G. Kaufman, Somerville, both of N.J.

[73] Assignee: Union Carbide Corporation, New York, N.Y.

[21] Appl. No.: 153,731

[22] Filed: Jun. 4, 1980

Related U.S. Application Data

[63] Continuation-in-part of Ser. No. 900,884, Apr. 28, 1978, abandoned, which is a continuation-in-part of Ser. No. 796,710, May 13, 1977, abandoned.

[51] Int. Cl.$^3$ ............................................. C09D 5/10
[52] U.S. Cl. ................................ 106/1.05; 106/1.17; 106/14.37; 106/14.39; 106/14.42; 106/14.44; 106/287.11; 106/287.16
[58] Field of Search .................... 106/1.17, 1.29, 14.17, 106/14.21, 287.16, 14.37, 14.39, 14.42, 14.44, 1.05, 287.11

[56] References Cited

U.S. PATENT DOCUMENTS

| 3,392,036 | 7/1968 | McLeod | 106/1.17 |
|---|---|---|---|
| 3,453,122 | 7/1969 | Weldes et al. | 106/1.17 |
| 3,634,109 | 1/1972 | Mago | 106/1 |
| 3,649,307 | 3/1972 | Oken | 106/1 |
| 3,660,119 | 5/1972 | Oken | 106/287.16 |
| 3,730,743 | 5/1973 | McLeod | 106/1 |
| 3,730,746 | 5/1973 | Boaz | 106/14 |
| 3,804,639 | 4/1974 | Trulsson et al. | 106/1 |
| 3,817,905 | 6/1974 | Lerner et al. | 260/37 R |
| 3,832,204 | 8/1974 | Boaz | 106/287.16 |
| 3,859,101 | 1/1975 | Slater | 106/14.41 |
| 3,893,864 | 7/1975 | Beers | 106/1 |
| 3,910,797 | 10/1975 | Beers | 106/1 |
| 3,917,648 | 11/1975 | McLeod | 106/1.16 |

OTHER PUBLICATIONS

Lantz, "Gas Evolution in Zinc Dust Paint", *Paint and Varnish Production*, Mar. 1961, pp. 25–80.

*Primary Examiner*—Lorenzo B. Hayes
*Attorney, Agent, or Firm*—Bernard Francis Crowe

[57] ABSTRACT

Single-package zinc-rich coating compositions are provided by blending zinc, a partially-hydrolyzed organic silicate and an aminosilane.

15 Claims, No Drawings

SINGLE-PACKAGE ZINC-RICH COATINGS

This is a continuation-in-part of Ser. No. 900,884 filed Apr. 28, 1978 which is in turn a continuation-in-part of Ser. No. 796,710 filed May 13, 1977, both now abandoned.

BACKGROUND OF THE INVENTION

This invention pertains to single-package zinc-rich coatings and more particularly to blends of zinc, partially hydrolyzed alkyl silicates and an aminosilane.

Zinc-rich coatings are effective in protecting steel against corrosion. The principle of this protective action is attributed to the fact that zinc, being higher than iron in the electromotive series of the elements reacts first in any environment conductive to the ionic dissolution (oxidation) of metals, thereby protecting the steel substrate.

As the name implies, zinc-rich coatings contain a high concentration of zinc in the dry film. This is required so as to provide the electrical continuity and, therefore, the conductivity necessary for the electrochemical process to take place.

In order to obtain these zinc-rich coatings on a ferrous substrate, a paint formulation containing very fine zinc dust produced by distilling the metal under controlled conditions of condensation is used. When the paint is applied, the metallic powder is held in place on the surface by a binder matrix. Zinc-rich coatings are classified, according to the nature of the binder, into organic or inorganic coatings.

Organic zinc-rich coatings utilize synthetic polymers as binders. Although such coatings afford effective corrosion protection, their heat and solvent resistance are limited.

Inorganic binders do not have these limitations. Such binders include water-soluble silicates, which are insolubilized by a curing composition after application, and alkyl silicates which do not require post cure. Although alkyl silicates contain organic chains, the resulting zinc-rich coatings are classified as inorganic because it is believed that, upon drying, a totally inorganic matrix of $SiO_2$ is formed. This reaction takes place slowly and proceeds through continuous stages of hydrolysis. The alkyl silicates that may be used in zinc-rich coatings may vary in their level of hydrolysis. If an alkyl silicate having a very low level of hydrolysis is used, the curing reaction is so slow that the film remains uncured for prolonged periods of time. Using alkyl silicates hydrolyzed to higher levels reduces the time necessary to obtain dry films. Unfortunately as the drying time decreases due to the higher degree of hydrolysis, the stability of the product in turn decreases. This lower stability is manifested in various ways. One is an increasing tendency for the paint to gel in the container upon storage. Another is a diminished pot life when alkyl silicate is mixed with the zinc dust in which case gelling usually occurs in a few hours.

One way to avoid instability of the paint composition in the container and premature gellation with the zinc, is to package the zinc separately from the alkyl silicate and mix the two components just prior to application.

This is done commercially in the so-called 2-package zinc-rich coating compositions and the field has adapted its working methods to this characteristic of the product or paint used to provide the coatings. However, the problems inherent in a 2-component coating composition, viz., doubled production, warehousing, stocking and inventory, as well as metering and mixing on site coupled with limited pot life makes a single-component zinc-rich paint primer composition very desirable.

If zinc-rich coatings are made with alkyl silicates of low degrees of hydrolysis, stability of the alkyl silicate in its container as well as the pot life of primer composition after addition of the zinc dust to the alkyl silicate improves considerably. The price of this improved stability, however, is a much lengthened drying time. The problem facing the formulator is therefore how to obtain curing of a single-package alkyl silicate, zinc-rich paint primer composition in a reasonably short time, while maintaining good package stability in conjunction with non-reactivity of the alkyl silicate with the zinc dust.

Several proposed solutions for this problem have been put forth in the prior art. Thus, for example in U.S. Pat. No. 3,653,930 a single-package, zinc-rich coating was obtained by the addition of low molecular weight amines to ethyl silicate hydrolyzed to about 40% together with nitro compounds to prevent gassing. The same general approach was also described in Netherlands Pat. No. 6,900,729.

In U.S. Pat. No. 3,660,119 film formation of a 40% hydrolyzed alkyl silicate was obtained through the use of strong bases, such as, sodium or potassium methoxide or ethoxide.

U.S. Pat. No. 3,859,101 discloses use of zinc chromate instead of nitro compounds as anti-gassing additives in a mixture of alkyl silicate and zinc dust.

U.S. Pat. No. 3,917,648 utilizes a reaction product of alkyl silicates with polyols to form a product which is stable in the presence of zinc.

The prior art references recited above suffer the following disadvantages:

1. Low molecular weight amines are volatile and therefore alkyl binders containing them lose effectiveness upon storage.
2. Low molecular weight amines are water-soluble therefore introducing a factor of water sensitivity into a coating primarily intended for corrosion protection.
3. Low molecular weight amines have high chemical reactivity. Thus they react with acids such as those produced by absorbed carbon dioxide during storage. This may account for their loss of effectiveness with time.
4. Low molecular weight amines present in the coating formed on the ferrous substrate have adverse effects on the resistance of the zinc-rich film to environmental agents and interfere with the adhesion and chemical resistance of top coats applied to the primer coat.
5. Low molecular weight amines are toxic, representing a potential safety hazard to those coming in contact with the coating compositions.
6. Strong bases such as alkali metal alkoxides or their corresponding hydroxide by-products adversely affect a metal of amphoteric character such as zinc.
7. The alkali metal alkoxides or their corresponding hydroxide by-products remain in the zinc-rich film formed on the ferrous substrate, introducing an element of water and chemical sensitivity which may affect the performance of top coats applied to the primer coat.
8. Polyol silicate zinc-rich coatings produce films which are softer than desirable.

It is therefore an object of the present invention to provide a single-package zinc-rich coating composition containing an alkyl silicate which as a primer paint coating composition remains stable when packaged for prolonged periods of time. It is another object to provide coating compositions which upon application to a ferrous substrate rapidly form a dry, hard, corrosion-resistant protective primer film.

SUMMARY OF THE INVENTION

The objectives enumerated above have been achieved with compositions consisting essentially of particulate zinc, an unhydrolyzed or a partially hydrolyzed organic silicate and a hardening amount of an hydrolyzable silicon compound selected from the class, consisting of:

(a) aminosilanes of the formula:

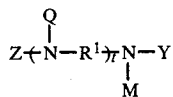

wherein:
t is an integer having values of 0 to 10;
each of M, Y, Q and Z are R or

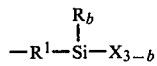

R is H, alkyl having 1 to 4 carbon atoms or hydroxyalkyl having 2 to 3 carbon atoms;
$R^1$ is $-C_2H_4-$, $-C_3H_6-$ or $-R^2-O-R^2-$ and $R^2$ is an alkylene radical having about 1 to 8 carbon atoms;
b is an integer having values of 0 to 2;
with the proviso that at least one of M, Q, Y or Z is

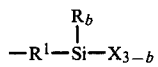

X is an hydrolyzable organic group;
(b) quaternary ammonium salts of the aminosilanes in (a); and
(c) the hydrolyzates and the condensates of the aminosilanes in (a).

The compositions described above are stable for prolonged periods of time in a closed container. Thus separate packaging is not required. When applied on a ferrous substrate, the zinc-rich formulations dry rapidly with the result that a hard, continuous, smooth film is formed having excellent corrosion protecting properties.

The alkyl silicates used in this invention are known in the art comprising unhydrolyzed alkyl and alkoxyalkyl silicates and alkyl and alkoxyalkyl silicates hydrolyzed up to about 40 percent by weight. Alkyl silicates are produced by the reaction of silicon tetrachloride and alcohols and alkoxy alcohols, generally in a reactor equipped with a stirrer, condenser and vat scrubber. The hydrogen chloride by-product is removed by reflux which may be carried out at reduced or atmospheric pressure. Through this process, the most common products TEOS (tetraethyl orthosilicate), and Cellosolve (Trademark of the Union Carbide Corporation for monoalkyl ethers of ethylene glycol) silicate are made.

Subsequently these products may be partially hydrolyzed by the addition of water and an acid catalyst. The amount of water added determines the degree of hydrolysis in the final product. Commercially available products derived from ethanol include the unhydrolyzed TEOS, Condensed Ethyl Silicate (about 7 percent hydrolysis), Ethyl Silicate 40 (40 percent hydrolysis containing 40% $SiO_2$), and Ethyl Silicate P-18, having an 80 to 85 percent hydrolysis level.

The hydrolyzable silicon compounds used in this invention are also known in the art and include a wide variety of compounds. Typical examples are gamma-aminopropyltriethoxysilane having the formula:

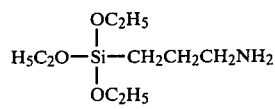

and N-beta(aminoethyl)-gamma-aminopropyltrimethoxysilane having the formula:

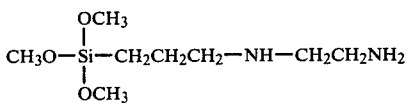

Other exemplary aminosilanes include:
aminomethyltrimethoxysilane,
gamma-aminopropyltrimethoxysilane,
gamma-methylaminopropyltrimethoxysilane,
gamma-aminopropyltripropoxysilane,
gamma-aminopropylmethyldiethoxysilane,
gamma-aminopropylethyldiethoxysilane,
gamma-aminopropylphenyldiethoxysilane,
gamma-aminoisobutyltrimethoxysilane,
delta-aminobutyltriethoxysilane,
delta-aminobutylmethyldiethoxysilane,
beta-aminoethyltriethoxysilane,
epsilon-aminopentylphenyldibutoxysilane,
N-(beta-aminoethyl)-gamma-aminopropyltrimethoxysilane,
N-(beta-aminoethylaminoethyl)-gamma-aminopropyltrimethoxysilane,
N-(gamma-aminopropyl)-gamma-aminoisobutylmethyldiethoxysilane,
N-(beta-aminoethyl)-gamma-aminopropyltriethoxysilane In addition to the above-enumerated aminosilanes which contain one silane group one can also use related aminosilanes containing two or more silane groups. Representative examples include:
N-beta[N'-gamma(trimethoxysilylpropyl)-aminoethyl]-gamma-aminopropyltrimethoxysilane

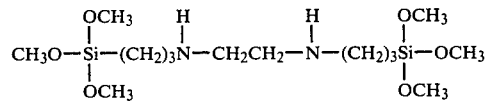

N,N-beta[bis{N'-gamma-(trimethoxysilylpropyl)aminoethyl}-gamma-aminopropyltrimethoxysilane]

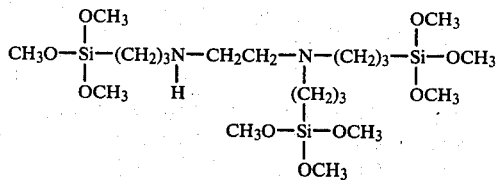

N,N-beta[bis{N',N'-gamma-bis(trimethoxysilylpropyl)aminoethyl)}-gamma-aminopropyltrimethoxysilane]

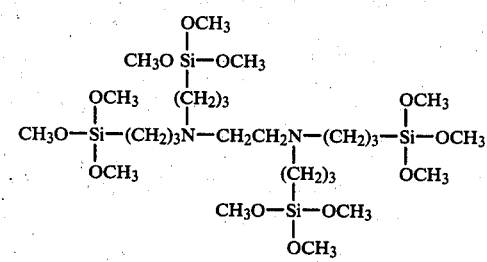

and the like.

A typical preparation of an alkoxysilylpropylamine is contained in U.S. Pat. No. 2,832,754 wherein gamma-chloropropyltriethoxysilane and liquid ammonia in a ratio of about 1 to 20 are charged into a pressure vessel heated at a temperature of about 100° C. for 12 hours. After cooling, filtering, washing and fractionally distilling the mixture approximately 50 percent of the desired product is obtained.

Another method for the preparation of aminoalkyltrialkoxysilane is described in U.S. Pat. No. 2,930,809 wherein a cyanoalkyltrichlorosilane described in U.S. Pat. No. 2,837,551 is prepared followed by alcoholysis and hydrogenation. For example, hexachlorodisilane and acrylonitrile in a 1:1 molar ratio are sealed in an autoclave heated to a temperature of about 200° C. for 2 hours. One of the products obtained upon fractional distillation of the mixture is beta-cyanoethyltrichlorosilane. Ethanolysis of this compound yields beta-cyanoethyltriethoxysilane. The latter compound is charged to a stainless steel pressure vessel together with Raney nickel. The temperature of the vessel is then cooled to −78° C. and an excess of liquid ammonia added. Hydrogen gas is charged into the system and the mixture heated at a temperature of 100° C. for 16 hours in a rocking autoclave. The mixture is then cooled to room temperature, filtered, washed with diethyl ether and fractionally distilled. One of the products obtained is triethoxysilylpropylamine.

The hydrolyzates and condensates of the aminosilanes described above can be prepared by the conventional known methods of hydrolysis and condensation. As is well known in the art, hydrolyzates represent the metathetical reaction products of water and corresponding hydrolyzable aminosilanes, while condensates represent the siloxane products obtained upon condensation of the hydrolyzate reaction mixture. The amount of water employed is not critical and merely depends upon the degree of hydrolysis and condensation desired. Accordingly, completely hydrolyzed as well as partially hydrolyzed products can be provided.

The preparation of quaternary salts of aminosilanes is disclosed in U.S. Pat. No. 3,389,160 incorporated herein by reference.

The term "hardening amount of a hydrolyzable silicon compound" is used in this invention to mean an amount sufficient to afford a dry film of the coating composition when placed on a ferrous substrate under ambient conditions. It has been found that at least about 5% by weight of hydrolyzable silicon compound, based on the weight of partially hydrolyzed organic silicate, is required to obtain a dry film within a practical exposure time, that is, in about 5 to 10 minutes. There is no critical upper limit but for practical purposes there is no advantage in using more than about 50% by weight of hydrolyzable silicon compound. While a range of about 10 to about 40% of hydrolyzable silicon can effectively be used, it is preferred to use about 15 to about 45% by weight of hydrolyzable silicon compound.

Although not essential for the practice of this invention, it is preferred that metal protective compositions of this invention include a water scavenging agent. Suitable water scavenging agents include zeolites, silica gel, tetraalkyl silicates, trialkyl borates, and the like. Zeolites are preferred because unlike the others given above the scavenging or water removal action does not produce a reaction product.

The zeolite water-scavenging agent can be any of the well known three-dimensional crystalline zeolites of the molecular sieve type, either naturally-occurring or synthetically prepared by conventional hydrothermal crystallization, and which have pore dimensions large enough to permit the passage of water molecules. Typical of the naturally occurring zeolites are clinoptilolite, chabazite, gmelinite, mordenite, erionite, offretite, phillipsite and faujasite. Illustrative of the synthetic molecular sieve zeolites are zeolite A, U.S. Pat. No. 2,882,243; zeolite Z, U.S. Pat. No. 2,882,244; zeolite R, U.S. Pat. No. 3,030,181; zeolite S, U.S. Pat. No. 3,054,657; zeolite T, U.S. Pat. No. 2,950,952; zeolite F, U.S. Pat. No. 2,996,358; zeolite B, U.S. Pat. No. 3,008,803; zeolite M, U.S. Pat. No. 2,995,423; zeolite H, U.S. Pat. No. 3,010,789; zeolite J, U.S. Pat. No. 3,011,809; zeolite Y, U.S. Pat. No. 3,130,007; and zeolite L, U.S. Pat. No. 3,216,789. Advantageously the zeolite selected will have a framework molar $SiO_2/Al_2O_3$ ratio of less than 50, and preferably less than 20, since the highly siliceous zeolites tend to exhibit organophillic properties to the detriment of their hydrophillic characteristics. Particularly suitable, because of their extremely high water-sorption capacity are the various cation forms of zeolite A. The potassium cation form of zeolite A, moreover, has an effective pore diameter of between 3 and 4 Angstroms and thus is capable of readily adsorbing water but effectively excludes most other molecules in the system on the basis of molecular size.

For use as adsorbents, the zeolites should be at least partially dehydrated, preferably fully dehydrated, by heating in air or vacuum at moderate temperatures of about 250° to 350° C. for several hours. Since zeolite crystals are small, seldomly larger than 10 micrometers, they can suitably be admixed in the coating compositions without adversely affecting its essential properties. Alternatively, the zeolite crystals can be formed into shaped agglomerates with conventional binders such as clays and enclosed in the container in which the product is stored.

The invention is described in the Examples which follow.

All parts and percentages are by weight unless otherwise specified.

EXAMPLE 1

SINGLE-PACKAGE ZINC-RICH COATING WITH ETHYL SILICATE 40 AND GAMMA-AMINOPROPYLTRIETHOXYSILANE

A ferrous metal coating composition was prepared by mixing 45 grams of partially hydrolyzed ethyl polysilicate containing 40 percent by weight of $SiO_2$, with 5 grams of gamma-aminopropyltriethoxysilane and 30 grams of finally divided zinc having a particulate size of about 2 to about 15 microns (American Smelting and Refining Co. ASARCO L-15). In addition, in order to maintain the mixture in an anhydrous state, 5 grams of a water scavenging agent (Union Carbide Corp. molecular sieves 4 A) were added and the composition was thinned with 50 grams of a hydrocarbon solvent consisting of a mixture of 61% by volume of paraffinics and 39% by volume of naphthenics having a boiling range of about 158°–196° C. of (American Mineral Spirits Company Mineral Spirits 66-3). The resultant liquid protective coating or primer paint had a package stability of over six months.

When this paint was applied by spraying to sand blasted, cold-rolled steel panels measuring approximately 4 inches by 4 inches by $\frac{1}{8}$ inch, there was obtained a smooth film which dried in less than ten minutes. The steel panel so coated was subjected for 1000 hours to salt spray (ASTM Method B-117) and 1000 hours in fresh water immersion (ASTM Method B-870). There was no evidence of corrosion or other signs of failure on the panel so coated.

EXAMPLE 2

SINGLE-PACKAGE ZINC-RICH COATING WITH ETHYL SILICATE 40 and N-BETA-(AMINOETHYL)-GAMMA-AMINO-PROPYLTRIMETHOXYSILANE A ferrous metal coating composition was prepared by mixing 45 grams of partially hydrolzed ethyl polysilicate containing 40% by weight of $SiO_2$ with 5 grams of N-beta(aminoethyl)-gamma-aminopropyltrimethoxysilane and 300 grams of finely divided zinc dust (ASARCO L-15), 5 grams of a water scavenging agent (Union Carbide molecular sieves 4A) and 50 grams of Amsco Mineral Spirits 66-3.

The resultant primer paint was stable for over six months in storage. When applied to sand blasted steel panels as in Example 1, the coating dried to a hard film in less than ten minutes. When these panels were subjected to a salt spray and water immersion for 1000 hours, they showed no evidences of corrosion or other failure.

EXAMPLE 3

SINGLE-PACKAGE ZINC-RICH COATING WITH TETRAETHYLORTHOSILICATE AND N-BETA(AMINOETHYL)-GAMMA-AMINO-PROPYLTRIMETHOXYSILANE

A ferrous metal protective composition was prepared by mixing 45 grams of tetraethylorthosilicate with 5 grams of N-beta(aminoethyl)-gamma-aminopropyltrimethoxysilane and 300 grams of ASARCO zinc dust L-15, 5 grams of molecular sieves 4A, and 50 grams of Amsco Mineral Spirits 66-3. The resultant primer paint was stable in storage for over six months. When applied as a spray coating to a sand blasted steel panel, a dry film formed in less than ten minutes. When panels were exposed as in Example 1 for 1000 hours in the salt spray and water immersion test, there was no evidence of corrosion or other failure.

EXAMPLE 4

SINGLE-PACKAGE ZINC-RICH COATING WITH CELLOSOLVE SILICATE AND GAMMA-AMINOPROPYLTRIETHOXYSILANE

A ferrous metal protective paint primer composition was prepared by mixing 45 grams of partially hydrolyzed ethoxyethylpolysilicate containing 19% $SiO_2$, 5 grams of gamma-aminopropyltriethoxysilane, 300 grams of ASARCO L-15 zinc dust, 5 grams of molecular sieves 4A and 50 grams of Amsco Mineral Spirits 66-3. The resultant primer paint composition had a package stability of over six months. When applied as a spray over sand blasted panels, the composition dried to a hard film in less than ten minutes. The panels, when subjected to the salt spray and water immersion test described in Example 1 for 1000 hours, showed no evidence of corrosion or other failures.

EXAMPLE 5

SINGLE-PACKAGE ZINC-RICH COATING WITH TETRAETHYLORTHOSILICATE AND POLY(AMINOALKYL)DIMETHYLPOLYSILOXANE

A ferrous metal protective composition was prepared by mixing 45 grams of tetraethylorthosilicate with 5 grams of a poly(aminoalkyl) dimethylpolysiloxane, 300 grams of ASARCO zinc dust L-15, 5 grams of molecular sieves 4A, and 50 grams of Amsco Mineral Spirits 66-3. The resultant paint was stable in storage for over six months. When this coating composition was applied to sand blasted steel panels, it formed a dry film in less than ten minutes. When similar panels were exposed for 1000 hours to salt spray and water immersion as in Example 1, there was no evidence of corrosion or other failure.

EXAMPLE 6

SINGLE PACKAGE ZINC-RICH COATING WITH ETHYL SILICATE 40 AND AN AMINOALKYLALKYLALKOXYSILANE

A ferrous metal protective composition was prepared by mixing 45 grams of partially hydrolyzed ethyl polysilicate containing 40 weight % of $SiO_2$ with 5 grams of an aminoalkylalkylalkoxysilane (Union Carbide Silane A-1902), 300 grams of ASARCO zinc dust L-15, 5 grams of molecular sieves 4A and 50 grams of Amsco Mineral Spirits 66-3. The resultant paint was stable for over six months on storage. When this coating composition was applied to sand blasted steel panels, it formed a dry film in less than ten minutes. When similar panels were exposed for 1000 hours to salt spray and water immersion as in Example 1, there was no evidence of corrosion or other failure.

EXAMPLE 7

SINGLE PACKAGE ZINC-RICH COATING WITH CELLOSOLVE SILICATE AND N-BETA (AMINOETHYL)GAMMA-AMINOPROPYL-TRIMETHOXYSILANE

A ferrous metal protective composition was prepared by mixing 45 grams of partially hydrolzed ethoxyethylpolysilicate, containing 10% $SiO_2$, 10 grams of N-beta (aminoethyl) gamma-aminopropyltrimethoxysilane, 300 grams of ASARCO zinc dust L-15, 5 grams of molecular sieves 4A, and 50 grams of Amsco Mineral Spirits 66-3. The resultant paint was stable upon storage for over six months. When this coating composition was applied to sand blasted steel panels, it formed a dry film in less than ten minutes. When similarly coated panels were exposed for 1000 hours to salt spray and water immersion, as in Example 1, there was no evidence of corrosion or other failure.

EXAMPLES 8-11

SINGLE PACKAGE ZINC-RICH COATINGS WITH ETHYL SILICATE 40 AND VARYING CONCENTRATIONS OF N-BETA(AMINOETHYL) GAMMA-AMINOPROPYLTRIMETHOXYSILANE

Ferrous metal protective compositions were prepared by mixing 45 grams of partially hydrolyzed ethyl polysilicate containing 40% by weight of $SiO_2$, 2 grams of molecular sieves 4A, 300 grams of ASARCO zinc dust L-15 and 2, 5, 10 and 20 grams respectively of N-beta(aminoethyl) gamma-aminopropyltrimethoxysilane. In each Example the resultant paints were stable for over six months. When these paints were applied to sand blasted steel panels, they formed dry films in less than ten minutes. When similarly prepared panels were exposed for 1000 hours to salt spray and water immersion, as in Example 1, there was no evidence of corrosion or other failure.

EXAMPLES 12-15

SINGLE PACKAGE ZINC-RICH COATINGS WITH VARYING RATIOS OF N-BETA(AMINOETHYL)GAMMA-AMINOPROPYLTRIMETHOXYSILANE AND MICA

Ferrous metal protective compositions were prepared by mixing the following components:

| Component | EXAMPLE | | | |
|---|---|---|---|---|
| | 12 | 13 | 14 | 15 |
| ASARCO Zinc Dust L-15 | 600g | 600g | 600g | 600g |
| Mica | 40g | 40g | 40g | 40g |
| Molecular Sieve 4A | 4g | 4g | 4g | 4g |
| Partially hydrolyzed ethyl silicate containing 40% $SiO_2$ | 109g | 105.5g | 102g | 98.5g |
| Union Carbide Silicone A-1120[a] | 11g | 22.5g | 33g | 45g |

[a]N-beta (aminoethyl) gamma-aminopropyltrimethoxysilane.

The resultant paints were stable for over six months. The resultant paints when applied to sand blasted panels formed a dry film in less than ten minutes. These coated panels when exposed for 1000 hours to salt spray and water immersion, as in Example 1, showed no evidence of corrosion or other failure.

EXAMPLE 16

SINGLE PACKAGE ZINC-RICH COATING WITH ETHYL SILICATE 40 AND N (BETA-ETHYLENEDIAMINOETHYL)-BETA-AMINOETHYLTRIMETHOXYSILANE

A ferrous metal coating composition was prepared by mixing 45 grams of partially hydrolyzed ethyl polysilicates containing 40% $SiO_2$, 10 grams of N-(beta-ethylene diaminoethyl)-beta-aminoethyltrimethoxysilane, 300 grams of ASARCO zinc dust L-15, and 5 grams of molecular sieves 4A. The resultant paint was stable for over six months.

When the resultant coating composition was applied to sand blasted steel panels, a dry film was obtained in less than ten minutes. Panels so coated and subjected to salt spray and water immersion, as in Example 1, showed no evidence of corrosion or other failure.

EXAMPLE 17

SINGLE PACKAGE ZINC-RICH COATING WITH ETHYL SILICATE 40 AND GAMMA-N-(GAMMA-BUTYLAMINO)PROPYL-TRIMETHOXYSILANE

A ferrous metal coating composition was prepared by mixing 45 grams of partially hydrolyzed ethyl polysilicate containing 40% $SiO_2$, 10 grams of gamma-N-(gamma-butylamino) propyltrimethoxysilane, 300 grams of ASARCO zinc dust L-15, and 5 grams of molecular sieves 4A. The resulting paint was stable for over six months.

When this coating was applied to a sand blasted steel panel, a dry film was obtained in less than ten minutes. These panels, so coated, and subjected to salt spray and water immersion, as in Example 1, showed no evidence of corrosion or other failure.

EXAMPLE 18

SINGLE PACKAGE ZINC-RICH COATING WITH ETHYL SILICATE 40 AND N,N BETA-(BIS-HYDROXYETHYL)-GAMMA-AMINOPROPYLTRIETHOXYSILANE

A ferrous metal coating composition was prepared by mixing 45 grams of partially hydrolzed ethyl polysilicate containing 40% $SiO_2$ with 10 grams of N,N beta-(bis-hydroxyethyl)-gamma-aminopropyltriethoxysilane, 300 grams of ASARCO zinc dust L-15, and 5 grams of Molecular Sieves 4A. The resultant paint was stable for over six months.

When this coating was applied to a sand blasted steel panel, a dry film was obtained in less than ten minutes. Panels so coated subjected to salt spray and water immersion for 1000 hours, as in Example 1, did not show evidence of corrosion or other failure.

EXAMPLE 19

SINGLE PACKAGE ZINC-RICH COATING WITH ETHYL SILICATE 40 AND POLYAMINOALKYLTRIALKOXYSILANE

A ferrous metal coating composition was prepared by mixing 45 grams of partially hydrolyzed ethyl polysilicate containing 40% $SiO_2$ with 10 grams of polyaminoalkyltrialkoxysilane, 300 grams of ASARCO zinc dust L-15, and 5 grams of molecular sieves 4A. This paint was stable for over six months.

When this coating was applied to a sand blasted steel panel, a dry film was obtained in less than ten minutes. Panels so coated subjected to salt spray and water immersion for 1000 hours, as in Example 1, did not show evidence of corrosion or other failure.

EXAMPLE 20

SINGLE PACKAGE ZINC-RICH COATING WITH ETHYL SILICATE 40 AND GAMMA-N,N-DIMETHYLAMMONIUMPROPYLTRIMETHOXYSILANE ACETATE

A ferrous metal coating composition was prepared by mixing 45 grams of partially hydrolyzed ethyl polysilicate containing 40% $SiO_2$ with 10 grams of gamma-N,N-dimethylammoniumpropyltrimethoxysilane acetate, 300 grams of ASARCO zinc dust L-15, and 5 grams of Molecular Sieves 4A. The resulting paint was stable for over six months.

When this coating was applied to a sand blasted steel panel, a dry film was obtained in less than ten minutes. Panels so coated subjected to salt spray and water immersion for 1000 hours, as in Example 1, did not show evidence of corrosion or other failure.

EXAMPLE 21

SINGLE PACKAGE ZINC-RICH COATING WITH CONDUCTIVE EXTENDER PIGMENT

A ferrous metal coating composition was prepared by mixing 45 grams of partially hydrolyzed ethyl polysilicate containing 40% $SiO_2$ with 5 grams of Union Carbide Silane A-1120, 200 grams of ASARCO zinc dust L-15, 100 grams of ferrous phosphite (an electrically conductive extender pigment available commercially as "Ferrophos" 2131, from Hooker Chemical Co., with a mean particle size of 6 microns), 5 grams of molecular sieves 4A, and 50 grams of Amsco Mineral Spirits 66-3. The resulting paint was stable for over six months.

EXAMPLE 22

Single Package Zinc-Rich Coating With Ethyl Silicate 40 and N-Beta[N'-Gamma(Trimethoxysilylpropyl)-Aminoethyl]-Gamma Aminopropyltrimethoxy Silane A ferrous metal coating composition was prepared by mixing 155.2 grams of partially hydrolyzed ethyl polysilicate containing 40 percent by weight of $SiO_2$ with 38.8 grams of N-beta[N'-gamma(trimethoxysilylpropyl)-aminoethyl]-gamma aminopropyltrimethoxy silane and 892.5 grams of finely divided zinc having a particulate size of about 2 to about 15 microns (American Smelting and Refining co. ASARCO-L-15), and 74 grams of a finely divided extender (Water-Ground Mica 325, of The English Mica Co.). In addition, in order to maintain the mixture in an anhydrous state, 7.5 grams of a water scavenging agent (Union Carbide Corp. molecular sieves 4 A) were added and the composition was thinned with 293.5 grams of ethylene glycol monoethyl ether (CELLOSOLVE). An antisettling agent was used to prevent hard settling (24 g of MPA-60-X, a hydrogenated castor oil, of NL Industries) and 15.5 g of a thickener (Ethocel Medium Premium 100, of Dow Chemical Co., was added to give desired viscosity). The resultant ethyl silicate liquid protective coating or primer paint had a package stability of over 3 months.

When this paint was applied by spraying to sand blasted, cold-rolled steel panels measuring approximately 4 inches by 8 inches by ⅛ inch, there was obtained a smooth film which dried in less than ten minutes. The steel panel so coated was subjected for 500 hours to salt spray (ASTM Method B-117) and there was no evidence of corrosion or other signs of failure on the panel so coated.

EXAMPLE 23

Single-Package Zinc-Rich Coating With Ethyl Silicate 40 and N-Beta[N'-Gamma(Trimethoxysilylpropyl)-Aminoethyl]-Gamma Aminopropyltrimethoxy Silane A ferrous metal coating composition was prepared by mixing 174.6 grams of Ethyl Silicate 40 with 19.4 grams of N-beta[N'-gamma(trimethoxysilylpropyl)-aminoethyl]-gamma aminopropyltrimethoxy silane, 892.5 grams of finely divided zinc dust (ASARCO L-15), 7.5 grams of a water scavenging agent (Union Carbide Molecular Sieves 4 A) 74 grams of Mica 325, 24 grams of MPA-60-X, 15.5 grams of Ethocel Medium Premium 100, and 293.5 grams of CELLOSOLVE.

The resultant primer paint was stable for 3 months in storage. When applied to sand blasted steel panels as in Example 1, the coating dried to a hard film in less than 10 minutes. When these panels were subjected to a salt spray and water immersion for 500 hours, they showed no evidences of corrosion or other failure.

CONTROLS A, B and C

These experiments demonstrate that vehicles containing less than 5% of the aminosilanes of this invention are not useful in the single-package compositions of this invention.

A mixture was prepared consisting of 70.0 parts by weight of ethyl silicate 40, 29.8 parts by weight of CELLOSOLVE solvent and 0.2 parts by weight of N-beta-(aminoethyl)-gamma-aminopropyltrimethoxysilane. In a similar manner, Controls B and C were prepared by mixing together 70 parts of ethyl silicate 40, 29.5 parts of CELLOSOLVE solvent and 0.5 and 2.0 parts respectively of N-beta(aminoethyl)-gamma-aminopropyltrimethoxysilane. This provided three vehicles which were then compounded into the following zinc-rich formulation:

Ethyl silicate vehicle (from above): 64.5 parts
Mica (an extender): 24.5 parts
Molecular Sieves 3A (a dessicant): 2.5 parts
MPA-1078 X (an anti-settling additive): 8.0 parts
Ethocel, 4.8% in xylene (a thickener): 103.0 parts
Zinc dust L-15: 297.5 parts When the three resulting compositions were applied on sand blasted panels, a powdery deposit resulted, which could easily be removed with the ball of the finger even one week after application. These compositions were, therefore, obviously ineffective as a zinc-rich primer coating composition.

CONTROLS D, E, F, G and H

The following control experiments demonstrate that vehicles made with silanes which do not contain an amino group are not useful in the compositions of this invention.

Vehicles were made by mixing 70 parts by weight of ethyl silicate 40, 10 parts by weight of CELLOSOLVE solvents, and 20 parts by weight of one of the five silanes listed below:
(1) vinyltrichlorosilane;
(2) vinyltriethoxysilane;
(3) methylvinyldichlorosilane;
(4) vinyl-tris(2-methoxyethoxy)silane;
(5) gamma-glycidoxypropyltrimethoxysilane.

These vehicles were compounded into the zinc-rich formulation described in Controls A–C.

When the five resulting compositions were applied on sand blasted panels, a powdery deposit resulted, which could be easily removed with the ball of the finger even one week after application. These compositions were obviously unsatisfactory as zinc-rich coating materials.

CONTROLS I, J, K, L, M and N

The following experimental controls demonstrate that vehicles described in U.S. Pat. No. 3,832,204 do not afford commercially acceptable zinc-rich coating compositions when compounded with silanes containing amino groups.

A base alkyl silicate vehicle was prepared in accordance with the procedure outlined in U.S. Pat. No. 3,832,204, Example II as follows:
CELLOSOLVE solvent: 403.5 grams
Ethanol: 201.9 grams
Ethocel standard 100: 24.6 grams
Butanol: 337.5 grams
Ethanol: 337.5 grams
Ethyl silicate 40: 1410.0 grams
1% HCl in water: 105.0 grams
Polyvinyl butyral XYHL (10% solution in butanol): 30.0 grams
Trimethylborate (10% solution in butanol): 30.0 grams Portions of the base alkyl silicate vehicle prepared above were compounded into coating formulations in the following proportions
Base alkyl silicate vehicle: 70 grams
Silane: 20 grams Silanes used in these formulations comprised the five silanes described in Controls D, E, F, G and H and also N-beta(aminoethyl)-gamma-aminopropyltrimethoxysilane. While the silanes from Controls D, E, F, G and H afforded stable coating formulations, the formulation using N-beta(aminoethyl)-gamma-aminopropyltrimethoxysilane was unstable, gelling in about a week in storage. This latter aminosilane is therefore not satisfactory for use in Boaz type zinc-rich coatings.

Portions of the base alkyl silicate vehicle prepared above were also compounded with silanes in a lower silane concentration as shown below:
Base alkyl silicate vehicle: 90 grams
Silane (added as a 10% solution in butanol - wt./vol.): 4 grams Again the formulations compounded from the silanes used in Controls D, E, F, G and H were stable in storage while the formulation compounded from N-beta(aminoethyl)-gamma-aminopropyltrimethoxysilane was unstable, gelling in about one week in storage. This latter aminosilane is therefore not satisfactory for use in Boaz-type zinc-rich coatings even at a lower concentration preferred by Boaz.

CONTROLS O, P, Q, R, S and T

The base alkyl silicate vehicle described in the previous controls was formulated from the instructions in U.S. Pat. No. 3,832,204, Example II with the exception that the trimethylborate was omitted. This was done in an attempt to make a direct comparison between a coating formulation containing silicate and a silane but no borate.

Portions of the base alkyl silicate vehicle from U.S. Pat. No. 3,832,204, Example II with alkyl borate omitted were compounded with silanes from Controls D, E, F, G and H and with N-beta(aminoethyl)-gamma-aminopropyltrimethoxysilane in ratios of both 70 of vehicle to 20 of silane and 90 of vehicle to 4 of silane (added as a 10% solution in butanol, wt./vol.). At both concentrations the formulations compounded from the silanes used in Controls D, E, F, G and H were stable in storage while the formulations containing the aminosilane, N-beta(aminoethyl)-gamma-aminopropyltrimethoxysilane were unstable, gelling after about one week of storage. This latter aminosilane is therefore not satisfactory for use in Boaz-type zinc-rich coatings at either concentration.

Although the invention has been described in its preferred forms with a certain degree of particularity, it is understood that the present disclosure has been made without departing from the spirit and scope of the invention.

What is claimed is:

1. A stable single-package composition for protecting ferrous metals from corrosion consisting essentially of particulate zinc, an unhydrolyzed organic silicate or an organic silicate hydrolyzed up to 40% and a hardening amount of about 5 to about 50% based on the weight of organic silicate of hydrolyzable silicon compound selected from the class consisting of
    (a) amino silanes of the formula

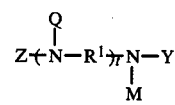

wherein:
t is an integer having values of 0 to 10;
each of M, Y, Q and Z are R or

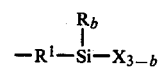

R is H, alkyl having 1 to 4 carbon atoms or hydroxyalkyl having 2 to 3 carbon atoms;
$R^1$ is $-C_2H_4-$, $-C_3H_6-$ or $-R^2-O-R^2-$ and
$R^2$ is an alkylene radical having about 1 to 8 carbon atoms;
b is an integer having values of 0 to 2; with the proviso that at least one of M, Q, Y or Z is

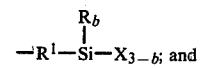

X is a hydrolyzable organic group;
    (b) quaternary ammonium salts of the amino silanes in (a); and
    (c) the hydrolyzates and condensates of the amino silanes in (a).

2. Composition claimed in claim 1 wherein X is an alkoxy group having 1 to 2 carbon atoms.

3. Composition claimed in claim 1 wherein X is an alkoxyalkoxyl group.

4. Composition in claim 3 wherein the alkoxyalkoxyl group is $-OC_2H_4OCH_3$.

5. Composition claimed in claim 1 wherein R is H.

6. Composition claimed in claim 1 wherein R is $-CH_3$.

7. Composition claimed in claim 1 wherein b=0.

8. Composition claimed in claim 1 wherein the organic silicate is an alkoxyalkyl polysilicate.

9. Composition claimed in claim 8 wherein the alkoxyalkylpolysilicate is ethoxyethyl polysilicate.

10. Composition claimed in claim 1 wherein the organic silicate is a tetraalkyl orthosilicate.

11. Composition claimed in claim 10 wherein the tetraalkyl orthosilicate is tetraethyl orthosilicate.

12. Composition claimed in claim 1 wherein the amount of hydrolyzable silicon compound is in the range of about 5% to about 45% by weight base on the weight of partially hydrolyzed organic silicate.

13. Composition claimed in claim 1 wherein the amount of hydrolyzable silicon compound is in the range of about 10 to about 40% by weight based on the weight of partially hydrolyzed organic silicate.

14. Composition claimed in claim 1 wherein the amount of hydrolyzable silicon compound is in the range of about 15 to about 45% by weight based on the weight of partially hydrolyzed organic silicate.

15. Composition claimed in claim 2 wherein the alkoxy group is —$OCH_3$.

* * * * *